UNITED STATES PATENT OFFICE.

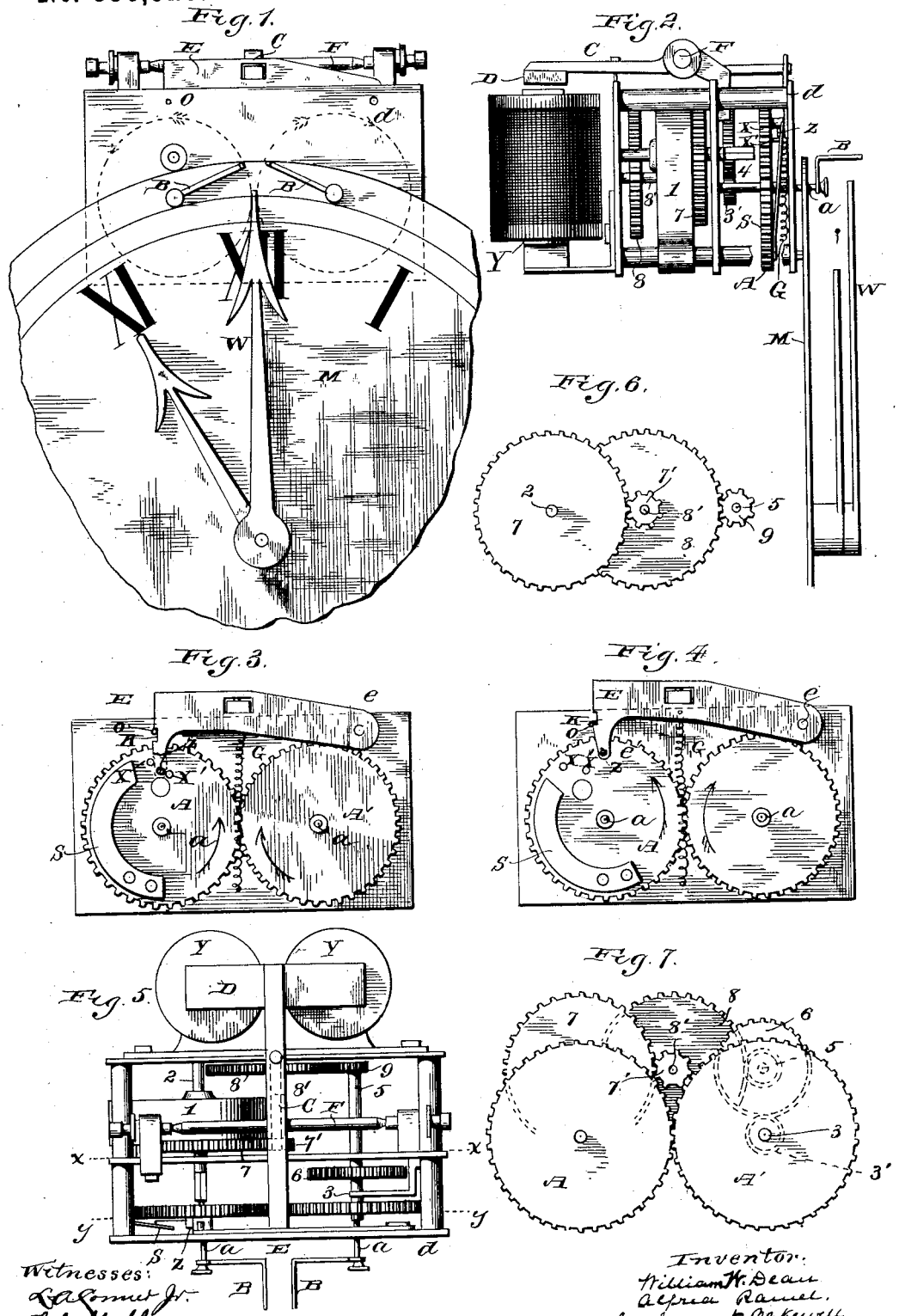

ALFRED RAMEL AND WILLIAM W. DEAN, OF ST. LOUIS, MISSOURI, ASSIGNORS OF ONE-HALF TO PAUL BAKEWELL, OF SAME PLACE.

CLOCK-SYNCHRONIZER.

SPECIFICATION forming part of Letters Patent No. 330,923, dated November 24, 1885.

Application filed March 2, 1885. Serial No. 157,600. (No model.)

*To all whom it may concern:*

Be it known that we, ALFRED RAMEL and WILLIAM W. DEAN, both of the city of St. Louis, State of Missouri, have made a certain new and useful Improvement in Clock-Synchronizers, of which the following is a full, clear, and exact description, reference being had to the annexed drawings, in which—

Figure 1 is a front elevation showing portion of clock-face; Fig. 2, an end elevation of Fig. 1; Fig. 3, a diagram showing the escapement-wheel and pawl at rest; Fig. 4, a diagram showing escapement-wheel released and pawl raised; Fig. 5, a top view of Fig. 1. Fig. 6 is a view on the line *x x*, Fig. 5, and Fig. 7 is a like view on the line *y y*.

Our invention is an improvement in clock-synchronizing devices; and it consists, mainly, in a mechanical arrangement of devices by means of which rotary motion is imparted to two regulating-arms and the automatic controlling of the rotation of these regulating-arms by an arrangement of devices to that end.

The construction of our invention is as follows: Mounted in suitable bearings and hung upon their central axes, *a a*, are two cog-wheels, A A'. These cog-wheels are of equal size, are hung abreast upon the same plane, and gear into each other, as shown in Figs. 3 and 4. The motion is imparted to these cog-wheels A A' preferably in the following manner: A coil of spring, 1, is tightly wound upon a shaft, 2, and in expanding or unwinding the spring 1 imparts motion to the cog-wheel 7, which is also keyed to the shaft 2 and gears with the pinion 7', which is keyed to the shaft 8'. Keyed to the shaft 8', at the other end thereof, is the gear-wheel 8, which gears with the pinion 9, which is keyed to the shaft 5, at the inner end of which shaft is keyed the gear-wheel 6, which meshes with a pinion, 3', which is keyed to the shaft 3. At the other end of the shaft 3 and keyed thereto is the gear-wheel A', which in turn imparts its motion to the similar wheel, A. The rate of revolution of these cog-wheels A A' is the same, and they are so arranged with relation to their driving-power as to revolve in opposite directions and in the directions, respectively, as indicated by the arrow in Figs. 3 and 4.

Thus far the most convenient and preferable means of setting our cog-wheels A A' into motion has been described.

Hung upon rotary shafts governed in their directions of rotation by the cog-wheels A A', these shafts being preferably extensions of the cog-wheel axes *a a*, are the regulating-arms B B. These arms are rigidly attached to, so as to rotate with, said shafts or axes. These arms B B, as also the shafts or axes to which they are attached, are made to rotate in opposite directions, turning from each other, and their directions of rotation respectively being in an upward, then downward, direction, instead of a downward and then upward direction. The directions of rotation of said arms B B, respectively, are the same as those of cog-wheels A A', as indicated in Figs. 3 and 4. These arms B B are placed in such relation to a clock-dial, preferably projecting through the dial, that their axes will be on a line parallel with the top of the end of the minute-hand of the clock when the minute-hand is at the point of twelve, as shown in Fig. 1, and these arms are so hung upon their shafts or axes and in such relation one to another that they will come nearest to each other in making their respective circuits at or near the point at which the end of the minute-hand is when the minute-hand is at the point of twelve, and the space between the arms B B at this point is the breadth of the end of the minute-hand.

So far as described, the rotation of the cog-wheels A A' and arms B B would be continuous while the driving force lasted, but for the following arrangement of devices: A lever, C, provided at one end with an armature, D, and connected at its other end to a pawl, E, and is pivoted, preferably, to a cross-bar, F, and so pivoted that, barring the strength of an electric current acting to attract armature D, or the application of some special power at that end, the end attached to pawl E will remain down, and to insure this position of lever C as its normal one a light spring, G, is attached to pawl E to hold it down. This pawl E is pivoted at its end *e*, preferably to the plate or frame-work *d*, in which the axes of cog-wheels A A' have their bearings, and it is provided at its other end with a projection or shoulder, *e'*, having a lug, Z. Now, the play of pawl E in its upward and downward movements is limited, preferably by means of a slot, K, cut into it, said slot working upon a lug, O, and said lug being preferably fastened to the plate or frame-work d, in which the shafts or axes of cog-wheels A A' find their bearings. Cog-wheel A is provided with two stops, X X', and these stops are placed near the periphery of the wheel and are arranged relatively to each other so that one shall be above and a little to one side of the other, so as to leave a space between them, as shown in Figs. 3 and 4.

S is a spring, preferably placed upon cog-wheel A, and attached to the periphery of the wheel and made to conform in shape thereto. It terminates at a slight distance in front of stop X, and its purpose is to brake the velocity of the rotation of the cog-wheel A as it terminates one revolution, by bearing up against lug Z on the shoulder of pawl E.

Y Y are electro-magnets. M is a clock-dial, and W the clock minute-hand.

When lever E is down and in its normal position, (see Fig. 3,) the lug Z on shoulder e' of pawl E abuts against stop X' of cog-wheel A, being directly in front of stop X' and between stop X' and stop X, thus holding cog-wheels A A' in place and preventing their rotation.

The arms B B are hung upon their shafts or axes in such manner that when lever E is down and cog-wheels A A' at rest, as stated, the arms will be in such position as to be out of reach of the minute-hand in describing its circle, as shown in Fig. 1.

The operation of my invention is as follows: Spring 1 being wound up through the system of shafts, cog-wheels, and pinions already described, a driving force is ready to act to rotate cog-wheels A A' directly the lug Z on pawl E is withdrawn from between stops X X'. Now, the instant a current of electricity is sent through electro-magnets Y Y, (this being done at every hour,) the armature D of lever C is attracted to electro-magnets Y Y, thus overcoming the pressure of pawl E and spring G and lifting pawl E. Pawl E is lifted as far as the length of its slot and lug O permit, (see Fig. 4,) and as pawl E is lifted its lug Z on its shoulder e' is lifted out of the way of stop X' of cog-wheel A and the wheel revolves; but cog-wheel A makes but one revolution, because of stops X X' and lug Z. By reason of its slot K and of lug O, lug Z of pawl E can only be lifted far enough to allow of the escapement of stop X'. After one revolution, should the armature D still be down upon the magnets, cog-wheel A is stopped by stop X coming in contact with lug Z; or, should armature D be released from the magnets, and consequently pawl E be in its normal condition, cog-wheel A is stopped by stop X' coming into contact with lug Z, so that after cog-wheel A has been allowed to make one revolution, by reason of the armature D being attracted to the electro-magnet, and lug Z lifted away from stop X', the cog-wheel A must be stopped by its stops X or X' coming in contact with the pawl E. As cog-wheel A revolves, it causes cog-wheel A' to revolve also, as already stated, and as the revolutions of the shafts or axes of regulating-arms B B are controled by these cog-wheels A A', these arms make just one revolution every time the armature is attracted to the magnets, catching the minute-hand of the clock at each revolution, if it be within reach of their circuits, and drawing it exactly to the point of twelve. These arms need not be placed so as to project through the dial of a clock, but may be arranged behind the dial and out of sight, and so as to act upon a special hand corresponding to and moving on the same shaft as the clock minute-hand.

We claim—

1. In a clock-synchronizing device, cog-wheels A A', rotated substantially as set forth, one of said cog-wheels having stops X X', rotary regulating-arms B B, mounted on suitable shafts and controlled in their rotation by the cog-wheels A A', pivoted lever C, having pawl E, said pawl E having lug Z to engage with stops X X' of cog-wheel A, and an armature, D, and electro-magnets Y Y, all combined and operating substantially as set forth, and for the purposes specified.

2. In a clock-synchronizing device, the combination of cog-wheels A A', rotated substantially as set forth, one of said cog-wheels having stops X X', rotary regulating-arms B B, mounted on suitable shafts and controlled in their line of rotation by the cog-wheels A A', pivoted lever C, having pawl E, said pawl E having lug Z and slot O, and an armature, D, electro-magnets Y Y, and lug K, substantially as described.

3. In a clock-synchronizing device, the combination of cog-wheels A A', rotated substantially as set forth, one of said cog-wheels having stops X X', rotary regulating-arms B B, mounted on suitable shafts and controlled in their line of rotation by the cog-wheels A A', pivoted lever C, having pawl E, said pawl E having lug Z and slot O, working on lug K, and an armature, D, and electro-magnets Y Y, the whole operating in connection with a clock-dial and minute-hand, substantially as set forth.

In testimony whereof we have affixed our signatures, in presence of two witnesses, this 16th day of February, 1885.

ALFRED RAMEL.
WILLIAM W. DEAN.

Witnesses:
PAUL BAKEWELL,
J. L. HORNSBY.